United States Patent [19]
Saito

[11] Patent Number: 5,943,362
[45] Date of Patent: Aug. 24, 1999

[54] SPREAD SPECTRUM RADIO COMMUNICATION SYSTEM

[75] Inventor: Naritoshi Saito, Tokyo, Japan

[73] Assignee: Kabushiki Kaisha Toshiba, Kawasaki, Japan

[21] Appl. No.: 08/493,314

[22] Filed: Jun. 21, 1995

[30] Foreign Application Priority Data

Jun. 23, 1994 [JP] Japan .................................. 6-141981

[51] Int. Cl.⁶ .................................................. H04B 1/69
[52] U.S. Cl. .......................... 375/200; 375/207; 375/231; 375/347; 370/342
[58] Field of Search ..................................... 375/200, 231, 375/207, 347, 358; 370/248, 249, 252, 294, 320, 321, 335, 342, 347; 455/69, 70, 88

[56] References Cited

U.S. PATENT DOCUMENTS

| | | | |
|---|---|---|---|
| 5,285,474 | 2/1994 | Chow et al. | 375/231 |
| 5,361,276 | 11/1994 | Subramanian | 375/200 |
| 5,377,183 | 12/1994 | Dent | 370/335 |
| 5,394,435 | 2/1995 | Weerackody | 370/342 |
| 5,511,068 | 4/1996 | Sato | 370/465 |
| 5,592,469 | 1/1997 | Szabo | 370/342 |

*Primary Examiner*—Don N. Vo
*Attorney, Agent, or Firm*—Banner & Witcoff, Ltd.

[57] ABSTRACT

According to the system of the present invention, in a base station, a radio transmission characteristic of a forward link is estimated by a parameter estimating section 18b based on a receiving state of a radio signal arrived from a mobile station through a reverse link. Then, RAKE control data to be set to a RAKE receiver of the mobile station is generated based on the result of the estimation, and RAKE control data is notified to the mobile station. On the other hand, in the mobile station, RAKE control data is extracted by a RAKE control data extracting section. Then, a tap coefficient is initialized to be set to a transversal filter of the RAKE receiver based on RAKE control data.

29 Claims, 12 Drawing Sheets

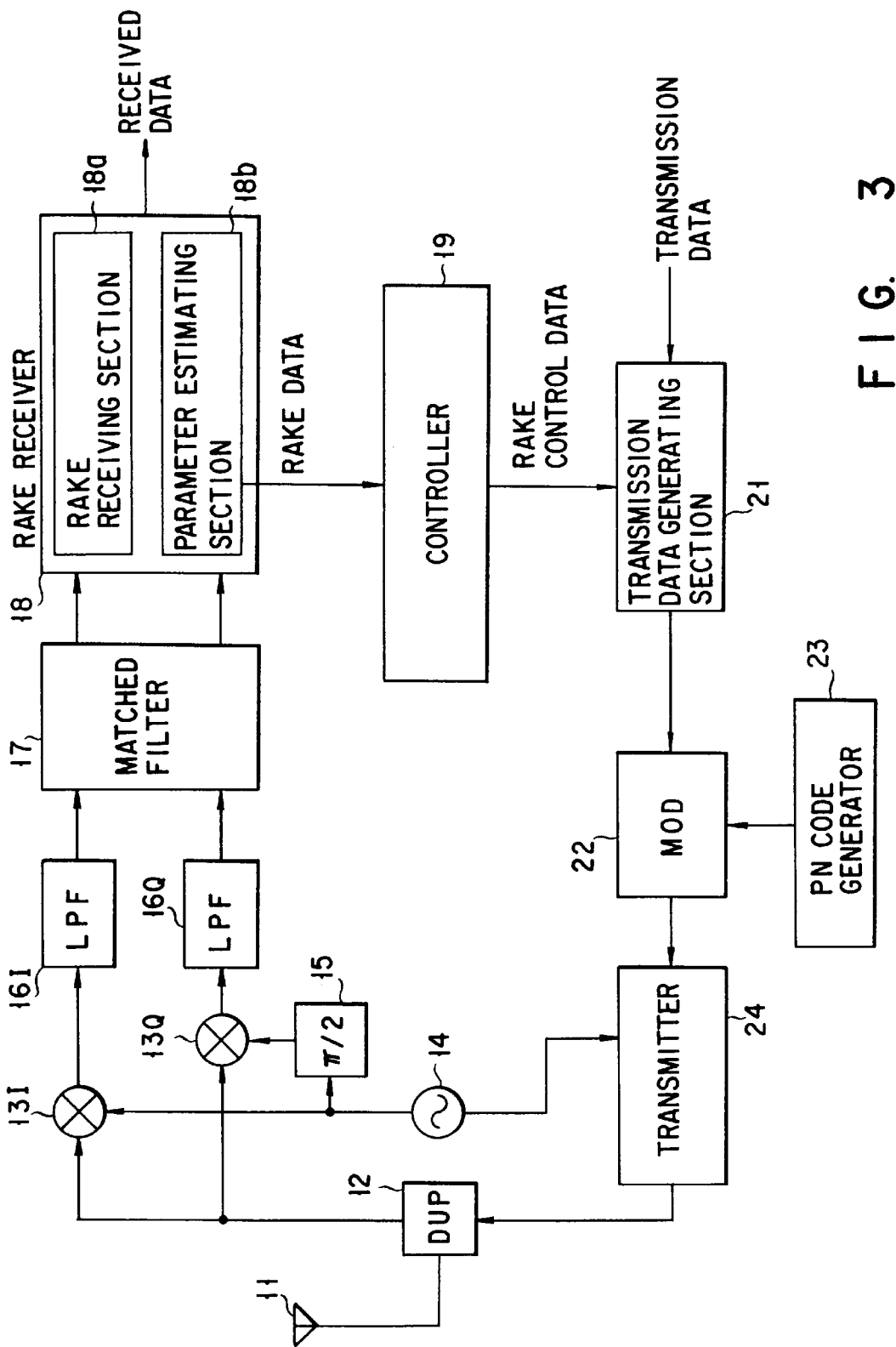
F I G. 3

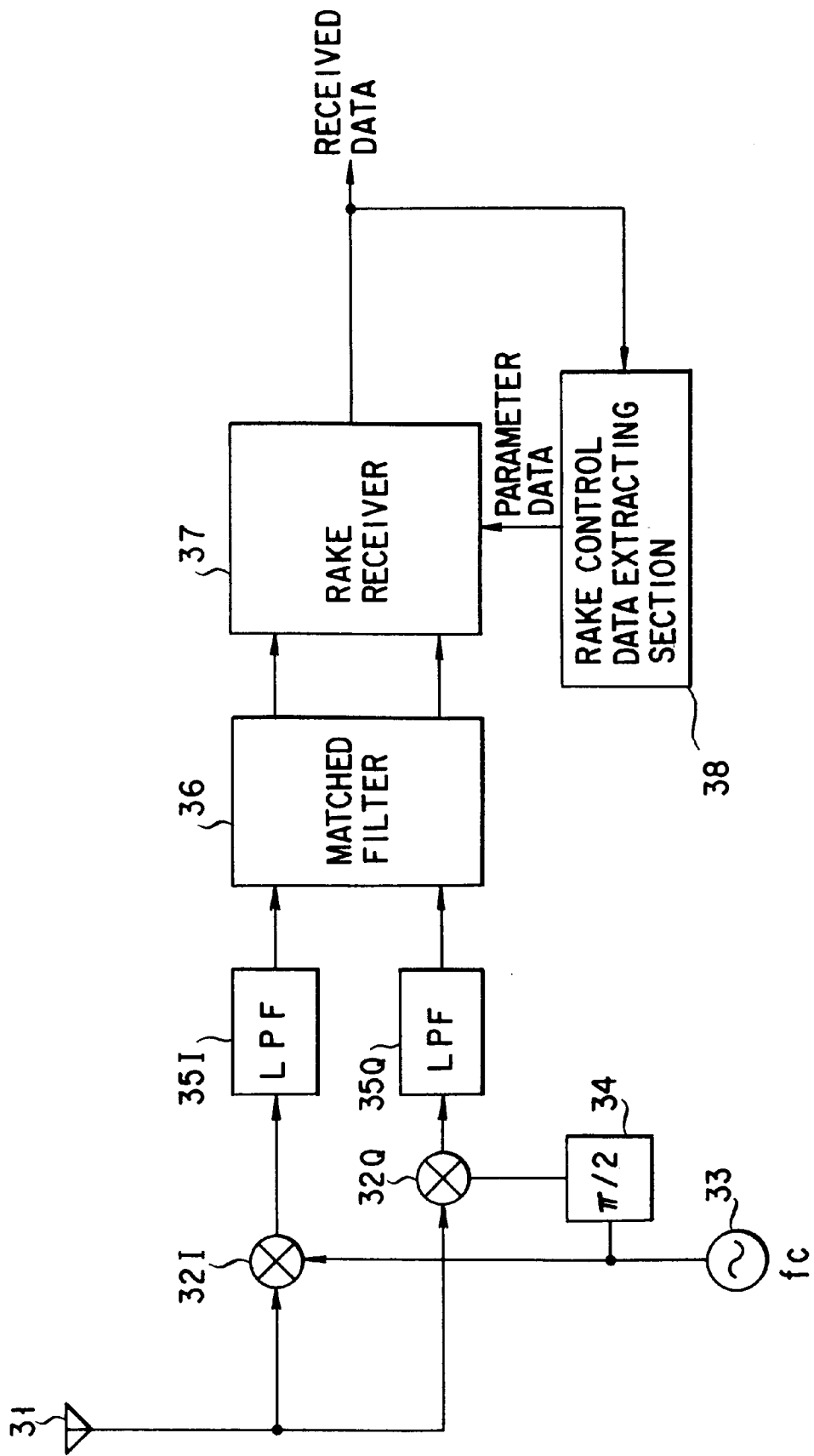
F I G. 4

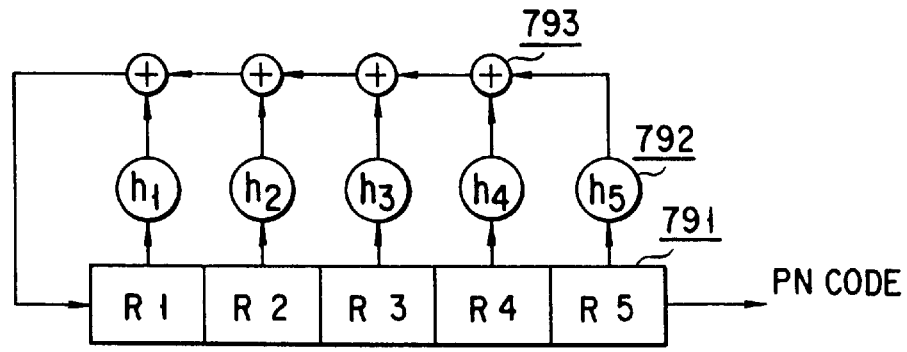
F I G. 11
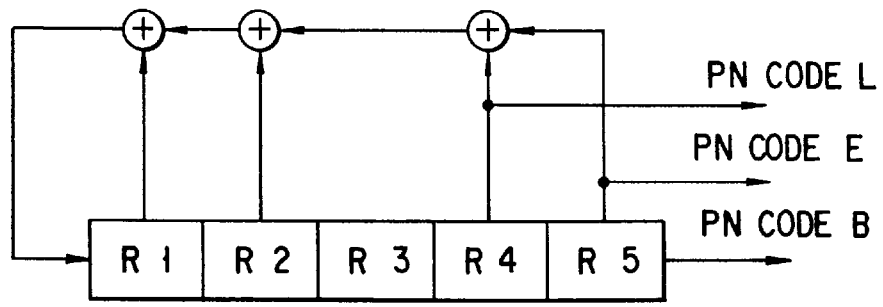
$(h_1, h_2, h_3, h_4, h_5,) = (1, 1, 0, 1, 1)$
INITIAL VALUE $(s_1, s_2, s_3, s_4, s_5) = (1, 1, 0, 0, 1)$
F I G. 12

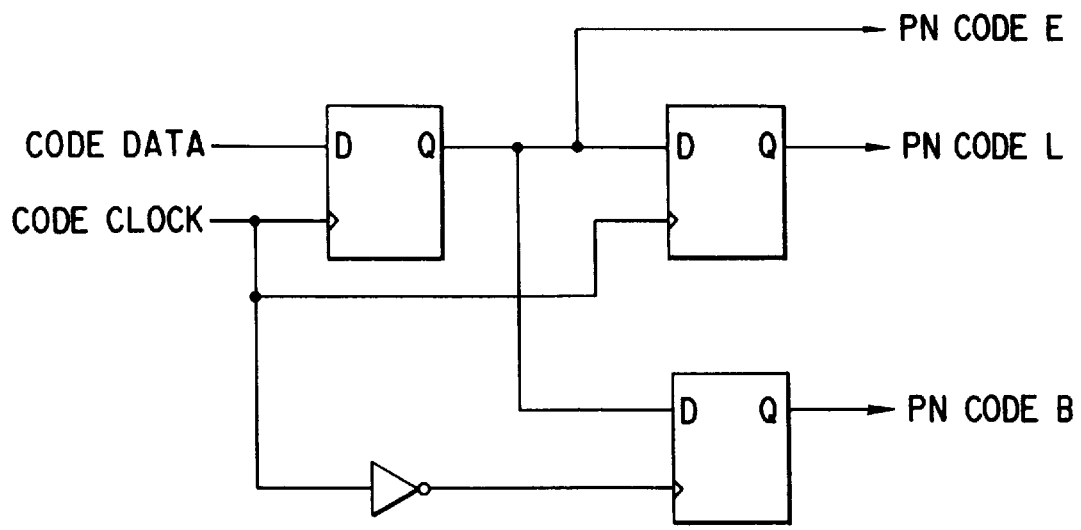
F I G. 13
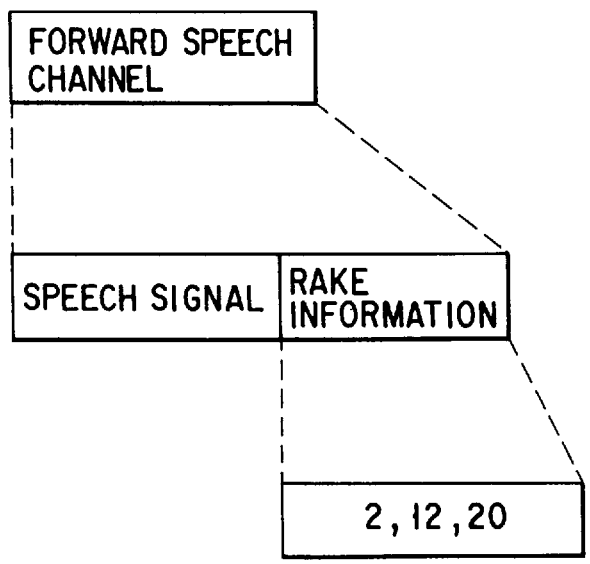
F I G. 14

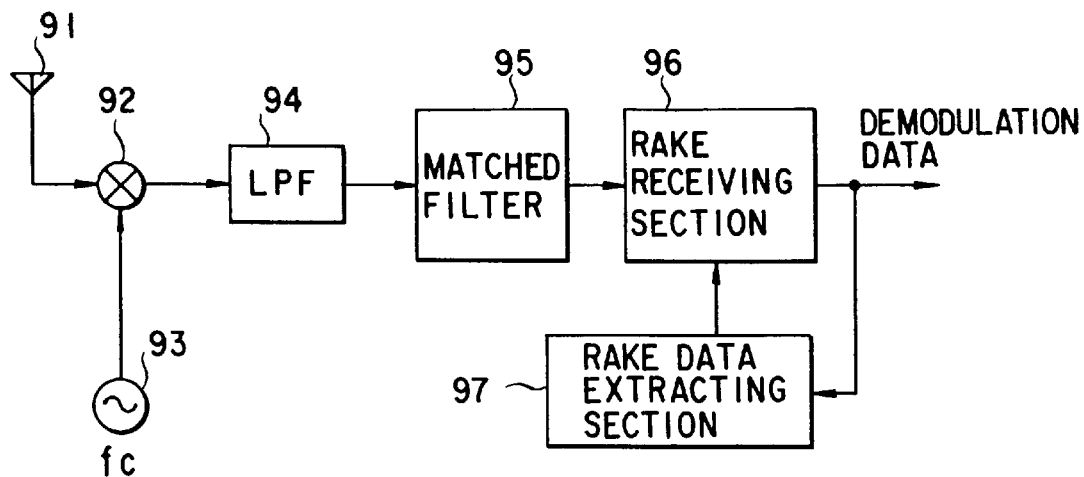
F I G. 17
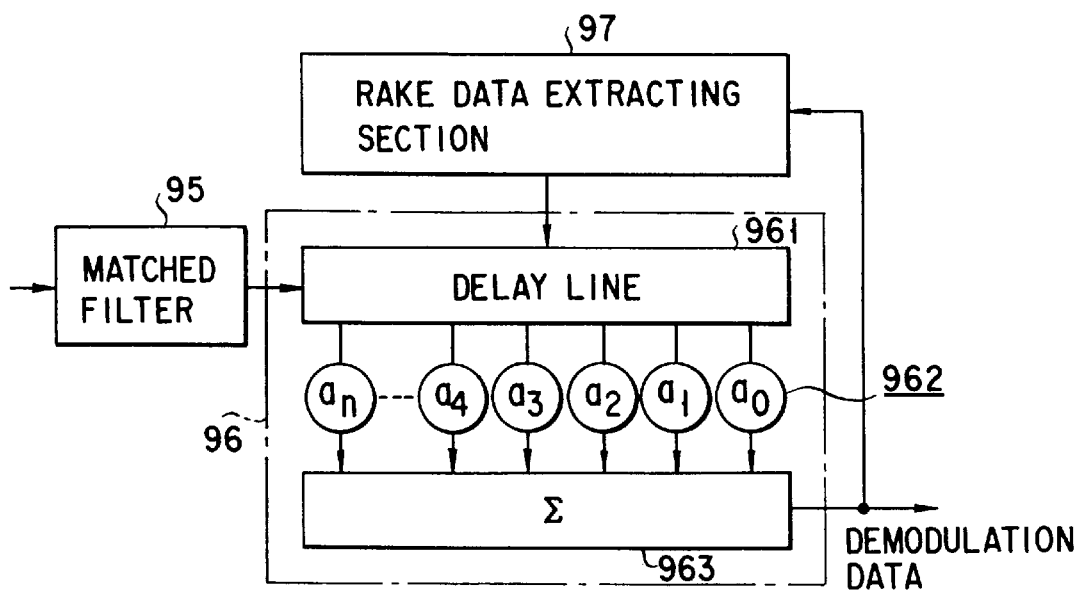
F I G. 18

SPREAD SPECTRUM RADIO COMMUNICATION SYSTEM

BACKGROUND OF THE INVENTION

1. Field of the Invention

The present invention relates to a mobile communication system such as a mobile telephone system, a cordless telephone system, a radio LAN system, and more particularly to a system to which a spread spectrum radio communication system is applied.

2. Description of the Related Art

In recent years, attention has been paid to a spread spectrum radio communication system, which is strong against interference and disturbance, as one of communication systems applied to a mobile communication system.

The spread spectrum is used to realize a code division multiple access (CDMA) system. According to the CDMA system, in a transmitter apparatus, digitized voice data or image data are modulated by a digital modulation system such as a PSK or an FSK modulation system. Thereafter, modulated transmission data is converted to a base band signal of a wide range by use of a spread code such as a pseudorandom noise code (PN code), and thereafter, up-converted to a signal of a radio channel frequency to be transmitted. On the other hand, in a receiver apparatus, a received radio frequency signal is down-converted to an intermediate frequency signal or a base band frequency signal. Then, a reverse spread is carried out by use of the same code as the PN code used in the transmitter apparatus. Thereafter, the signal is digitally demodulated by the digital system such as the PSK or FSK demodulation system to reproduce received data.

In this kind of system, a RAKE receiver is used as one measure against fading. The RAKE receiver collects signals spreading in time sequence to provide diversity, and the following two structures are known well.

One structure will be explained as follows.

More specifically, a transversal filter with taps is connected to an output of a matched filter. Then, a weighting of a tap coefficient is changed, so that pulse strings outputted from the matched filter are added to provide a multi path synthesis.

The other structure will be explained as follows.

More specifically, a plurality of finger circuits comprising a timing tracking loop and a data demodulation section are provided. Then, these finger circuits are independently operated, so that the multi path synthesis can be provided.

However, in an actual mobile communication, a multi path of 10 nsec to 100 nsec exists indoors. In order to synthesize the multi path signals in the CDMA system, a chip rate of the PN code must be set to be high, such as 10 MHz to 100 MHz. Due to this, in the RAKE receiver, there are needed a high speed clock in accordance with the high chip rate, and a wide frequency band. Therefore, in the present state, no useful measures are taken in order to synthesize the multi path signals of 10 nsec to 100 nsec. Moreover, in the conventional RAKE receiver, since the chip rate is generally set to about 2 MHz, such a receiver is not useful in practical use.

Furthermore, in the above-explained RAKE receiver using the transversal filter with taps, the tap coefficient of the transversal filter with taps must be a suitable value so as to add and synthesize the output pulses of the matched filter. Conventionally, in order to set the taps coefficient, there is proposed a system in which a sounding signal for measuring is inserted to a communication signal to be transmitted in the transmission side. However, this system is not useful since a reduction of a communication efficiency and complication of a communication protocol are caused.

Also, there is proposed a system in which numerical calculations are performed by use of a learning identification method, and a least squares method, or a Kalman-filter-algorithm to obtain the tap coefficient. However, if a calculation processing section is provided in the RAKE receiver to perform these numeral calculations, the structure of the RAKE receiver is complicated and enlarged, and power consumption is increased. They are extremely unfavorable problems in the mobile radio apparatus, which aims at miniaturizing and lightening the apparatus and reducing power consumption as the most important subject.

SUMMARY OF THE INVENTION

A first object of the present invention is to provide a spread spectrum radio communication system in which complicated numerical calculations in the transmission of a sounding signal and a mobile station are not required, whereby improvement of a communication efficiency, a miniaturization of the size of an apparatus, reduction of the weight of the apparatus, and low power consumption can be obtained.

A second object of the present invention is to provide a spread spectrum radio communication system and its radio communication apparatus in which a plurality of received transmission signals having a phase difference can be synthesized without providing a signal search caused by a phase variation of a spread signal in a mobile station, whereby signal synthesizing and reproducing means of the mobile station can be efficiently used to reduce fading and unfavorable influence of interference.

In order to attain the first object, weighting data generating means and weighting data transmitting means are provided in a base station. Then, weighting data to be provided to weighting and synthesizing means of a signal receiving and reproducing circuit formed in a mobile station is obtained by weighting data generating means in accordance with the characteristic of a radio transmission line between the base station and the mobile station, and obtained weighting data is notified to the mobile station by weighting data transmitting means. On the other hand, in the mobile station, weighting data receiving means and weighting data receiving and setting means are provided. Then, weighting data notified from the base station is received by the weighting data receiving means, received weighting data is set to the weighting and synthesizing means, and the synthesis operation of the transmission signal is performed by the signal receiving and reproducing circuit in accordance with weighting data.

As a result, according to the first invention, in the base station, weighting data to be provided to the signal receiving and reproducing circuit formed in the mobile station is generated based on the characteristic of the radio transmission line between the base station and the mobile station, and weighting data is transmitted to the mobile station to be set to the weighting and synthesizing means. Due to this, it is not needed that the sounding signal be transmitted to the mobile station from the base station in order to set weighting data to the weighting and synthesizing means. Moreover, it is unnecessary to carry out a complicated calculation processing in order to calculate weighting data in the mobile station. Therefore, the communication efficiency, miniaturization and reduction of the weight of the mobile station, and reduction of consumption power can be improved.

Furthermore, the first invention is characterized in that weighting data is calculated by weighting data generating means based on the receiving state of the radio signal transmitted to the base station from the mobile station. In this case, as a radio transmission system between the base station and the mobile station, there is used a FDD (frequency division duplex) system in which a different radio frequency is allocated to the forward link and the reverse link, or there is used a TDD (time division duplex) in which a common radio frequency is allocated to the forward link and the reverse link to time-divisionally duplicate and transmit data on the common radio frequency.

As a result, weighting data can be obtained in accordance with the state of the radio transmission line to be set to the weighting and synthesizing means. Therefore, a suitable signal synthesis can be performed in accordance with the change of the state of the radio transmission line.

Also, in the case of using, particularly TDD system as a radio transmission system between the base station and the mobile station, influence of frequency selective fading can be removed so that the weighting data can be correctly calculated in the base station since the transmission characteristics of the radio transmission line between the forward link and the reverse link become substantially the same.

In order to attain the second object, delay processing means of the transmission signal and control data notifying means are provided in a base station. Then, a first transmission signal, to which spread spectrum processing is provided by a spread code, is delayed by time corresponding to a multiple of an integer of a chip rate of the spread code by the delay processing means, so that second transmission signals of a plurality of schemes having an arbitrary relative time difference are generated, and the generated second transmission signals of the plurality of schemes are transmitted to the mobile station by the same radio frequency, respectively. Moreover, data representing an amount of delay of the second transmission signals and data representing the number of schemes of the second transmission signals are notified to the mobile station. On the other hand, in the mobile station on the receiving side, signal synthesizing and reproducing means is provided. Then, by the signal synthesizing and reproducing means, the received second transmission signals of the plurality of schemes are synthesized after adjusting the time positions based on data representing the amount of delay notified from the base station and data representing the number of schemes of the translation signals, and the first transmission signal is reproduced.

As a result, according to the second invention, in the base station on the transmission side, the second transmission signals of the plurality of schemes, which are transmitted to artificially have an arbitrary time difference are synthesized after adjusting the time positions based on data representing the amount of delay notified from the base station in advance and data representing the number of schemes of the translation signals, thereby the first transmission signal is reproduced.

Therefore, in the mobile station on the receiving side, there is no need that the phase of the spread code is varied to search the delayed transmission signal. Due to this, the synthesis of the plurality of receiving and transmitting signals can be simply and correctly performed. In other words, the receiving and transmitting signals can be efficiently synthesized, thereby unfavorable influence of fading and interference can be sufficiently controlled.

As the structure of the delay processing means, the following two structures can be considered.

One is delay processing means, which generates the delay transmission signal of at least one scheme having an arbitrary time difference to the first transmission signal, and outputs the delay transmission signal and the first transmission signal as a second transmission signal. The other is delay processing means, which generates the first transmission signals by a plurality of amounts of delay corresponding to the multiple of the integer of the chip rate of the spread code to generate delay transmission signals of the plurality of schemes having an arbitrary relative time difference, and outputs these delay transmission signals as a second transmission signal.

Also, as the structure of the signal synthesizing and reproducing means, the following two structures can be considered.

One is the signal synthesizing and reproducing means, which comprises a plurality of finger circuits, each having a timing tracking loop and a data demodulation section, to variably set a spread code phase of the plurality of finger circuit based on data representing a time difference notified from the base station and data representing the number of transmission signals. The other is the signal synthesizing and reproducing means, which comprises a matched filter and a transversal filter with taps for multi path synthesizing a pulse string outputted from the matched filter by changing weighting of tap coefficients to be added, so that the tap coefficient of the transversal filter with taps is variably set based on data representing the amount of delay notified from the base station and data representing the number of transmission signals.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a circuit block diagram representing a main structure of a base station of the system of the first embodiment of the present invention;

FIG. 4 is a circuit block diagram representing a main structure of a mobile station of the system of the first embodiment of the present invention;

FIG. 11 is a circuit block diagram representing an example of the structure of a PN code generating section;

FIG. 12 is a view representing an example of a tap coefficient to be provided to the PN code generating section of FIG. 11;

FIG. 13 is a view representing a circuit for generating a generation timing of each of PN codes E, L, and B;

FIG. 14 is a view representing an example of a transmission format of transmission data including RAKE data;

FIG. 17 is a circuit block diagram representing an example of the structure of a receiving system of a mobile station having a RAKE receiver of a transversal filter type; and FIG. 18 is a circuit block diagram representing an example of the structure of a RAKE receiver of the mobile station of FIG. 17.

DETAILED DESCRIPTION OF THE PREFERRED EMBODIMENTS (First Embodiment)

According to a first embodiment, a received condition of a radio signal arrived from a mobile station is detected in a base station, parameter data to be set to a RAKE receiver of the mobile station is estimated based on the result of the detection, and estimated parameter data is informed to the mobile station as RAKE control data to be set to the RAKE receiver.

Figure 1:
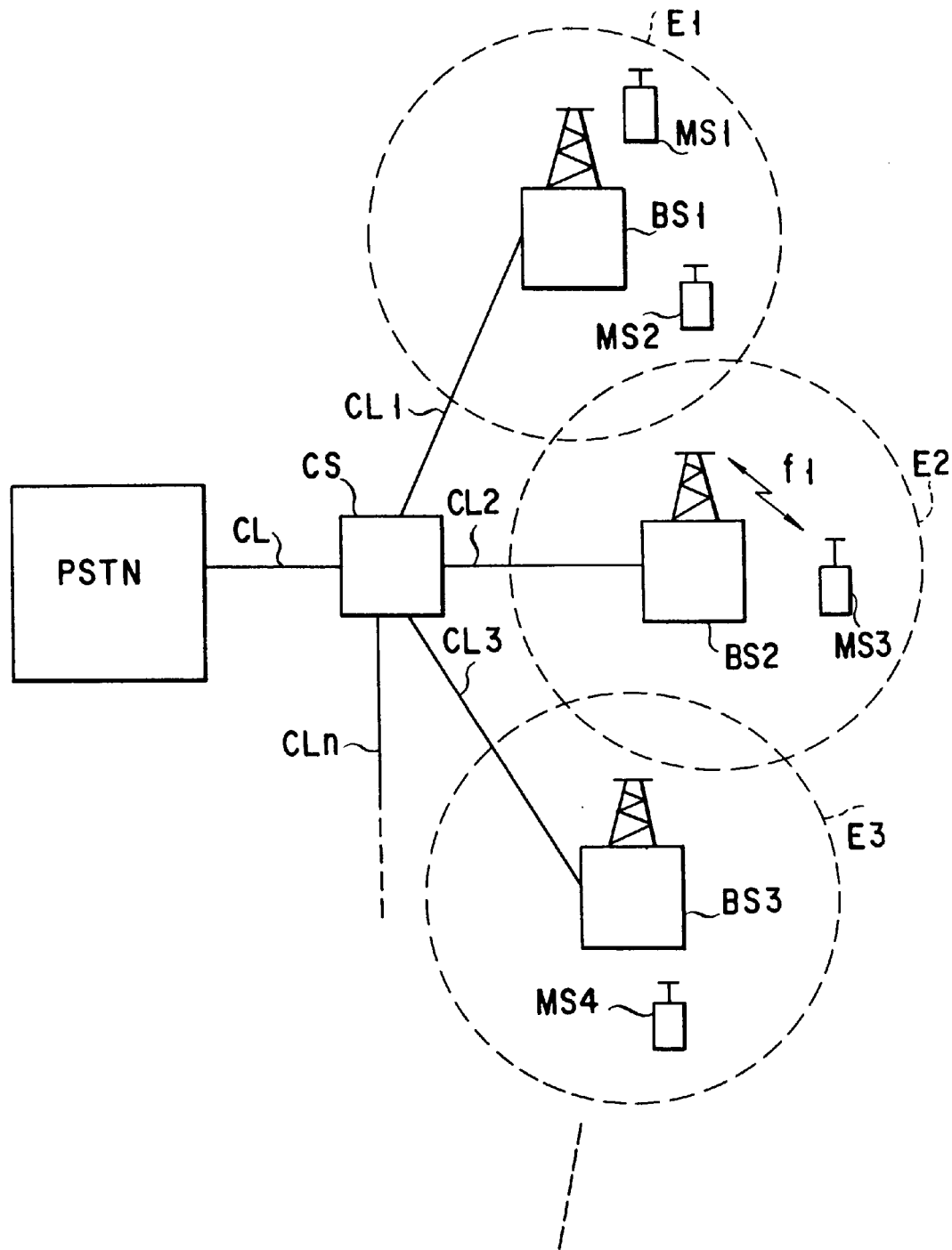
FIG. 1 is a schematic structural view of a cellular mobile communication system of a first embodiment of the present invention.

FIG. 1 is a schematic structural view of a cellular mobile communication system of the first embodiment of the present invention.

The cellular mobile communication system comprises a control station CS, a plurality of base stations BS1, BS2, ..., and a plurality of mobile stations MS1, MS2, ... The control station CS is connected to a public switched telephone network through a wired line group CL. Each of the base stations BS1, BS2, ... is connected to the control station CS through each of wired lines CL1, CL2, ... Moreover, the base stations BS1, BS2, ... form radio zones E1, E2, ... each which is called a cell, respectively.

According to the system of the first embodiment, in order to carry out a radio communication, a CDMA (code division multiple access) system is used as an access system for obtaining an access between the base stations BS1, BS2, ... and the mobile stations MS1, B2, ... and a TDD (time division duplex) system is used as a signal duplex system.

Figure 2:
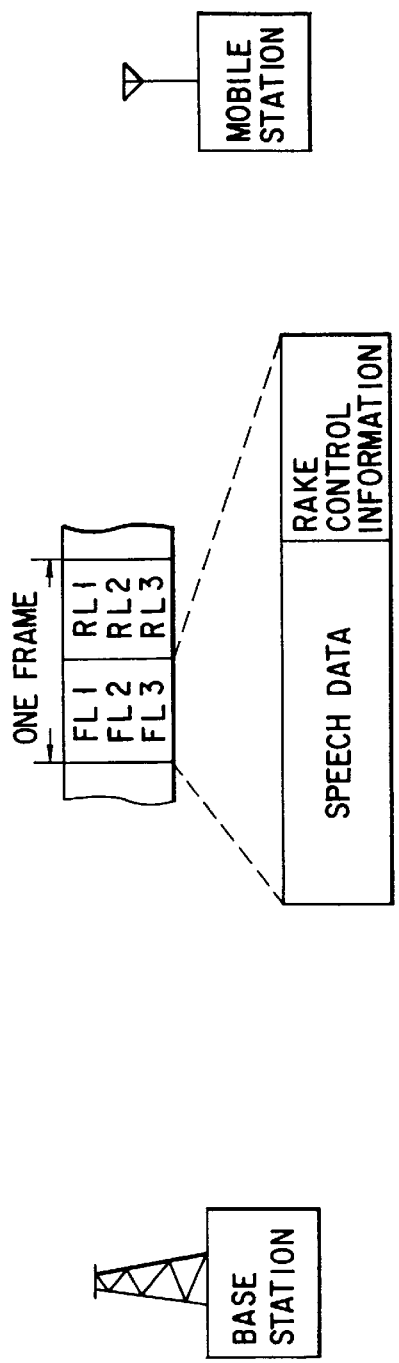
FIG. 2 is a view representing a radio transmission format of the system of the first embodiment of the present invention.

More specifically, a radio frequency f1, which is used to transmit speech data, is set between the base stations BS1, BS2, ... and the mobile stations MS1, MS2, ... in carrying out the radio communication. FIG. 2 shows a transmission format of a signal to be transmitted by the radio frequency f1. As shown in FIG. 2, the transmission format is structured such that one frame is divided into a slot for a forward link and a slot for a reverse link and three forward channels FL1 to FL3 are duplicated onto the slot for the forward slot and three reverse channels RL1 to RL3 are duplicated onto the slot for the reverse slot. In other words, according to the system of the first embodiment, the forward link and the reverse link are set on the common radio frequency f1.

Figure 6:
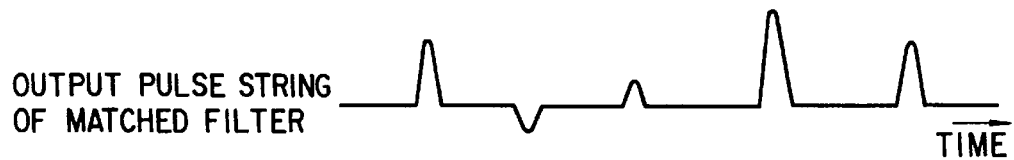
FIG. 6 is a view of a signal waveform representing an example of a pulse string outputted from a matched filter.

FIG. 3 is a circuit block diagram representing a main structure of the base stations BS1, BS2 ... In the figure, radio signals transmitted from the mobile stations MS1, MS2, ... (not shown) are received by an antenna 11, and inputted to mixers 13I and 13Q through a duplexer (DUP) 12. Each of the received radio signals is mixed with a local oscillation signal by each of the mixers 13I and 13Q, and down-converted to a base band signal. For generating the local oscillation signal, an oscillation output fc of a local oscillator 14 is branched into two outputs, and one of two outputs is phase-shifted to $\pi/2$ by a phase shifter 15. The received base band signals outputted from the mixers 13I and 13Q are inputted to a matched filter 17 after removing unnecessary high frequency components therefrom by low pass filters (LPF) 16I and 16Q. If the received base band signals are inputted to the matched filter 17, a pulse string having a plurality of peak strings is outputted from the matched filter 17 in accordance with arrival time and signal intensity, for example, as shown in FIG. 6. The output pulse string is inputted to a RAKE receiver 18.

Figure 5:
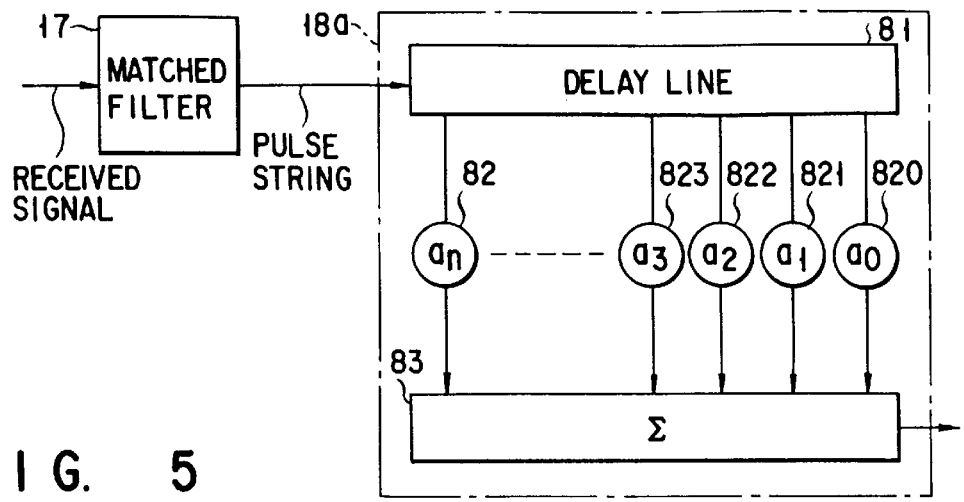
FIG. 5 is a circuit block diagram representing one example of a structure of a RAKE receiving section of a transversal filter type.

The RAKE receiver 18 has a RAKE receiving section 18a and a parameter estimating section 18b. The RAKE receiving section 18a comprises transversal filters with taps, which are arranged at time interval of an inverse number of a PN code rate (chip rate). FIG. 5 shows one example of the structure. The pulse string outputted from the matched filter 17 is delayed by a delay line 81 to provide the time interval of the inverse number of the PN code rate, and inputted to each of taps 820 to 82n. Then, tap coefficients a0 to an are weighted onto these taps 820 to 82n, mutually added by an adder 83, and outputted as received data.

The parameter estimating section 18b estimates transmission characteristics of the radio line in the forward link based on the radio signal arrived from the mobile station through the reverse link. Then, in accordance with the estimation result of the transmission characteristics, the parameter estimating section 18b calculates RAKE control data to be set to a RAKE receiver 37 of the mobile station. Specifically, RAKE control data is tap coefficients to be set to the respective taps a0 to an of the transversal filter of the RAKE receiver 37. For example, the tap coefficients can be obtained as follows.

(a0, a1, a2, a3, ..., an)=(1, 0, 0, 1, 0, ... 1).

In this case, ak (k=0, 1, 2, ..., n)=1 expresses a switch-on of the tap, and ak=0 expresses a switch-off of the tap. Then, calculated RAKE data is transferred to a controller 19.

The controller 19 has RAKE control data notifying control means in addition to normal control functions, such that a radio channel connection control and a speech control, which are necessary for a communication between the mobile station and the base station. RAKE control data notifying control means transfers RAKE control data to a transmission data generating section 21 to be notified to the mobile station. For example, as shown in FIG. 2, the transmission data generating section 21 adds RAKE control data to transmission data to generate slot transmission data. Then, slot transmission data is inserted to a transmission slot FL2 of the forward link to be inputted to a modulator (MOD) 22.

The modulator 22 digitally modulates transmission data of the transmission slot. Thereafter, the digitally modulated transmission data is spectrum-spread-modulated to be converted to a transmission signal of a high band. A transmitter 24 up-converts the transmission signal supplied from the modulator 22 to a predetermined radio frequency signal, and amplifies electric power to a predetermined transmission power level. Then, the radio frequency signal is supplied to the antenna 11 through the antenna duplexer 12 so as to be transmitted to the mobile station.

On the other hand, the mobile station is structured as follows. FIG. 4 is a circuit block diagram representing the main structure of the mobile station.

In the figure, the radio frequency signal arrived from the base station is received by an antenna 31, branched into two signals, and inputted to mixers 32I and 32Q, respectively. Each of the received radio signals is mixed with a local oscillation signal by each of the mixers 32I and 32Q, and down-converted to a base band signal. For generating the local oscillation signal, an oscillation output fc of a local oscillator 33 is branched into two outputs, and one of two outputs is phase-shifted to $\pi/2$ by a phase shifter 34. The received base band signals outputted from the mixers 32I and 32Q are inputted to a matched filter 36 after removing unnecessary high frequency components therefrom by low pass filters (LPF) 35I and 35Q. If the received base band signals are inputted to the matched filter 36, a pulse string having a plurality of peak strings is outputted from the matched filter 36 in accordance with arrival time and signal intensity. The output pulse string is inputted to a RAKE receiver 37.

Similar to the RAKE receiving section 18a of the base station, the RAKE receiver 37 comprises transversal filters with taps, which are arranged at time interval of an inverse number of a PN code rate (chip rate). More specifically, the pulse string outputted from the matched filter 36 is delayed by the delay line 81 to provide the time interval of the inverse number of the PN code rate, and inputted to each of taps 820 to 82n, as shown in FIG. 5. Then, tap coefficients a0 to an are weighted onto these taps 820 to 82n, mutually added by the adder 83, and outputted as received data.

In order to carrying out decode-processing, received data is inputted to coder/decoder (CODEC) (not shown), and a RAKE control data extracting section 38. The RAKE control extracting section 38 extracts RAKE control data from received data. Then, a coefficient is set to each tap of the transversal filter of the RAKE receiver 37 in accordance with extracted RAKE control data. For example, if data (a0, a1, a2, a3, . . . , an)=(1, 0, 0, 1, 0, . . . , 1) arrives as RAKE control data, tap coefficients a0, a1, a2, a3, . . . , an are set to the respective taps.

The following will explain an operation of the above-structured system.

If a radio link is set between the base station and the mobile station, in the base station, the radio transmission characteristics of the forward link FL are estimated from the received state of the radio signal arrived from the mobile station through the reverse link RL by the parameter estimating section 18b of the RAKE receiver 18, prior to receiving and transmitting of speech data. Then, the tap coefficients, which are to be set to the transversal filters of the RAKE receiver 37 of the mobile station, are generated as RAKE control data in accordance with the estimated characteristics. In accordance with the instruction of the controller 19, RAKE control data is added to transmission data by the transmission data generating section 21 to be transmitted to the mobile station through the forward link.

On the other hand, in the mobile station, prior to receiving and transmitting of speech data, RAKE control data including in received data arrived from the base station is extracted by the RAKE control data extracting section 38. Then, extracted RAKE control data is set to each tap of the transversal filter of the RAKE receiver 37.

In this way, the tap coefficient is initialized to the transversal filter of the RAKE receiver 37 of the mobile station.

Therefore, if the receiving and transmitting of speech data between the base station and the mobile station is started, an addition of energy of multi path signals is performed in accordance with the set tap coefficients in the RAKE receiver 37 of the mobile station, and received data is reproduced. Therefore, even if multi path fading is generated on the radio transmission path, unfavorable influence caused by multi path fading is removed from the RAKE receiver 37 of the mobile station. As a result, received data having a high signal/noise ratio (S/N) can be reproduced.

According to the above-mentioned system of the first embodiment, in the base station, the parameter estimating section 18b estimates transmission characteristics of the radio line in the forward link based on the radio signal arrived from the mobile station through the reverse link. Then, RAKE control data to be set to the RAKE receiver 37 of the mobile station is generated based on the result of the estimation, and generated RAKE control data is notified to the mobile station. On the other hand, in the mobile station, RAKE control data is extracted by the RAKE control data extracting section 38. Then, the tap coefficients are initialized to the transversal filter of the RAKE receiver 37 based on RAKE control data.

Therefore, according to the above-mentioned embodiment, the tap coefficients, which are appropriate for the transmission characteristic of the forward link at the time of starting the data communication, is initialized to the transversal filter of the RAKE receiver 37. Due to this, in the following communication operation, even if multi path fading is generated on the radio transmission path and the multi path signals are received to the mobile station by unfavorable influence caused by multi path fading, energy of the multi path signals is efficiently added and synthesized, so that received data having a high S/N can be reproduced.

Moreover, according to the first embodiment, since it is unnecessary to perform the calculation for obtaining the tap coefficient in the mobile station, miniaturization of the circuit structure of the mobile station and reduction of power consumption can be improved. Furthermore, only RAKE control data may be transmitted from the mobile station to the base station at the time when the data communication is started, and it is unnecessary to transmit a sounding signal during the data communication. As a result, a communication efficiency can be highly maintained, and complication of the communication protocol can be avoided.

Furthermore, according to the first embodiment of the present invention, since there is used the TDD system in which the forward link and the reverse link are set on the same radio frequency, influence of a frequency selective fading can be excluded to correctly estimate the transmission characteristic of the forward link from the reverse link. Thereby, the correct tap coefficients can be set to the RAKE receiver 37 of the mobile station.

The above-mentioned first embodiment can be variously modified as follows.

More specifically, the above embodiment explained that RAKE control data is generated in the base station prior to the start of the data communication, and the generated RAKE control data was notified to the mobile station, thereby initializing the tap coefficients to the RAKE receiver of the mobile station. However, RAKE control data may be generated by a fixed or arbitrary timing in the base station after the data communication is started, and notified to the mobile station, thereby renewing the tap coefficient of the RAKE receiver 37 of the mobile station. Moreover, after initializing the tap coefficient, the transmission characteristic of the radio transmission path may be always monitored in the base station. Then, when the transmission characteristic is changed to be more than a predetermined amount, RAKE control data may be notified to the mobile station, thereby renewing the tap coefficients of the RAKE receiver 37.

Figure 7:
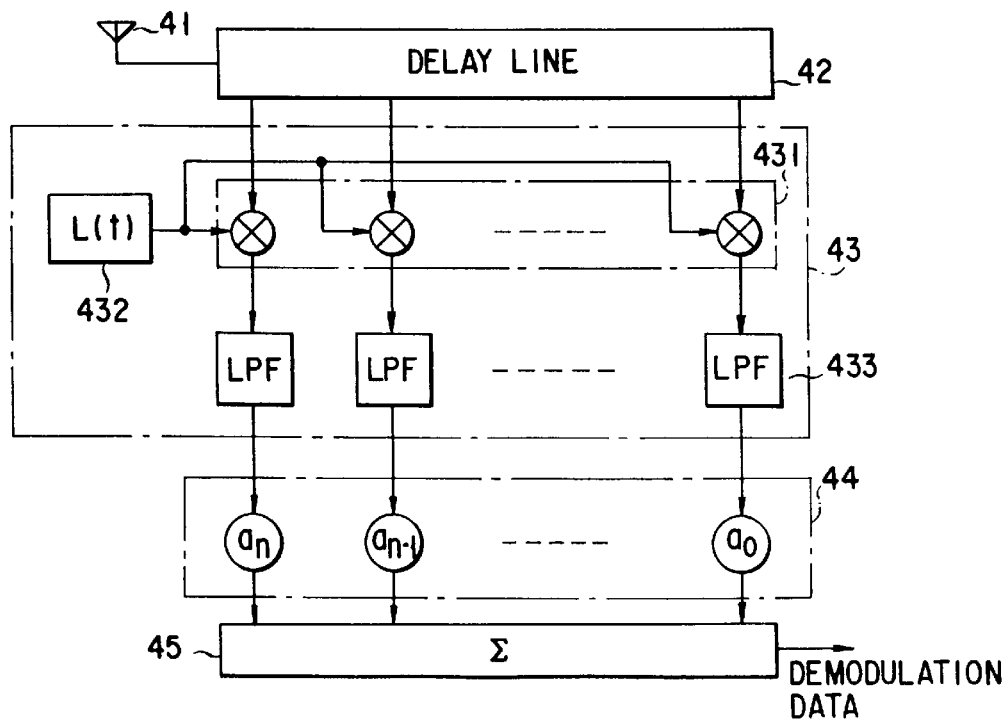
FIG. 7 is a circuit block diagram representing a structure of a RAKE receiver of a type in which a reverse spread is performed after delay of a received signal.

The above first embodiment explained the case in which the RAKE receiver is connected to the output of the matched filter. However, the present invention can be applied to a case in which a RAKE receiver performs a reverse spread after the delay of the received signal. FIG. 7 is a circuit block diagram representing the structure.

In the figure, a radio signal received by an antenna 41 is delayed by a delay line 42, and inputted to a spectrum reverse spread circuit 43. The spectrum reverse spread circuit 43 comprises a plurality of mixers 431, a PN code generator 432, and a plurality of low pass filters 433. In the spectrum reverse spread circuit 43, the delayed received signal inputted from the delay line 42 is synthesized with a PN code generated from the PN code generator 432 to be reversely spread. Then, a high frequency component is removed from the reversely spread received signal by the low pass filter (LPF) 433, and the received signal is inputted to a weighting circuit 44. The tap coefficient, which is notified as RAKE control data from the base station, is set to the weighting circuit 44. Therefore, the delayed received signal outputted from the spectrum reverse spread circuit 43 is weighted in accordance with the tap coefficient, and inputted to an adder 45. The respective delayed received signals outputted from the weighting circuit 44 are mutually added by an adder 45, so that demodulated data is reproduced.

The present invention can be also applied to a case where a receiver of a finger type is used as a RAKE receiver. In other words, the finger circuit comprises a timing tracking loop and a data demodulating circuit. By a symbol synthesizer, a symbol synthesizing processing of the plurality of received signals is performed in accordance with RAKE control data. RAKE control data is used to designate what synthesis is performed by the symbol synthesizer. RAKE control data is prepared in the base station, and transmitted to the mobile station.

Further, the above first embodiment explained the case in which the present invention is applied to the system in which the forward link and the reverse link are set on the same radio frequency. However, in a case where frequency selection fading is not often generated, the present invention may be applied to a system in which the forward link and the reverse link are set on the different radio frequency, that is, a CDMA-FDD.

Furthermore, the above first embodiment explained the case in which RAKE control data is used as binary switch data for turning on/off the tap. However, tap coefficient data may be quantized and quantized data may be notified to the mobile station as RAKE control data.

(Second Embodiment)

According to the second embodiment, in the base station, a delayed transmission signal is generated by artificially delaying a transmission signal by only a multiple of an integer of the chip rate of the PN code. Then, the generated delayed transmission signal and the transmission signal in which the spread processing is provided are transmitted to the mobile station by the same radio frequency. Also, data, which shows an amount of delay of the delayed transmission signal, and data, which shows a number of transmission signals to be transmitted, are notified to the mobile station. In the mobile station, the plurality of received transmission signals are adjusted in their time and positions, and mutually synthesized, thereby reproducing an original transmission signal, based on data, which shows the amount of delay of the delayed transmission signal, and data, which shows a number of transmission signals.

Figure 8:
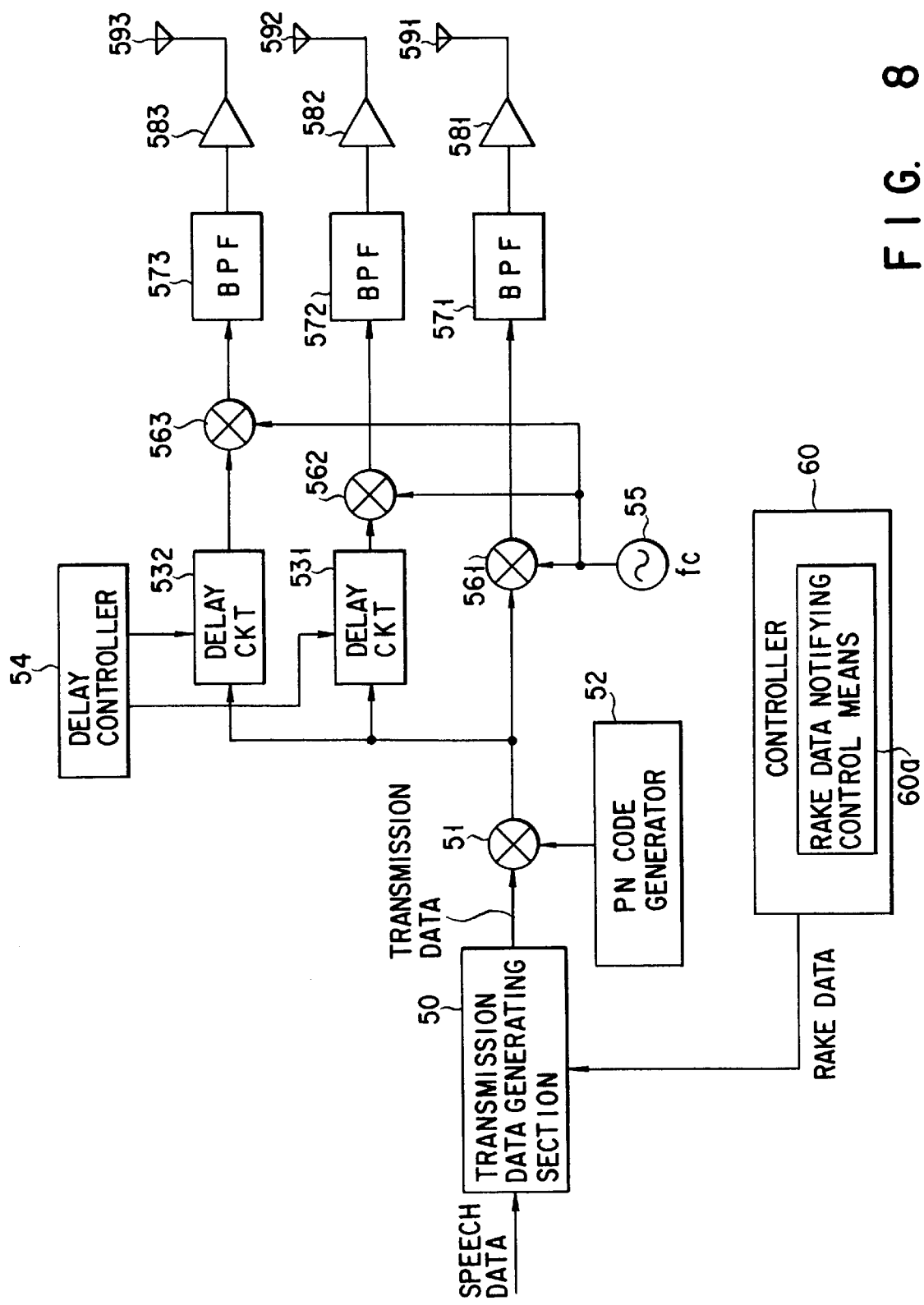
FIG. 8 is a circuit block diagram representing a main structure of a transmitting section of a base station of a system of a second embodiment of the present invention.

FIG. 8 is a circuit block diagram representing the main structure of the transmitting section of the base station of the system of the second embodiment of the present invention.

In this figure, transmission data outputted from a transmit data generating section 50 is spectrum-spread by a PN code generated from a modulator 51, and inputted to a mixer 561. In the mixer 561, a carrier frequency fc generated from a carrier oscillator 55 is digitally modulated in accordance with transmission data, thereby outputting a modulating carrier signal. As a digital modulation system, for example, a π/4 shifted QPSK (π/4 shifted quadrature phase shift keying) system is used.

On the other hand, transmission data outputted from the modulator 51 is inputted to each of first and second delay circuits 531 and 532. Each of these delay circuits 531 and 532 comprises a latch group in which a chip rate clock of the PN code is used as an input clock. These delay circuits 531 and 532 perform delay processing of transmission data in accordance with an amount of delay designated by a delay controller 54. The amount of delay, which is set to each of the delay circuits 531 and 532 by the delay controller 54, is set to an arbitrary multiple of an integer of the chip rate of the PN code generated from the PN code generator 52. For example, "12 times" is set to the first delay circuit 531 and "20 times" is set to the second delay circuit 532.

Delayed transmission data outputted from these delay circuits 531 and 532 are inputted to mixers 562 and 563. In each of these mixers 562 and 563, the carrier frequency fc generated from the carrier oscillator 55 is digitally modulated in accordance with delayed transmission data, thereby outputting a delayed modulating carrier signal.

The modulating carrier carrier signal outputted from the mixer 561 and two delayed modulating carrier signals outputted from the mixers 562 and 563 are subjected to a predetermined frequency band limitation by band pass filters (BPF) 571, 572, and 573, respectively. Moreover, these signals are amplified to a predetermined transmitting output level by transmission amplifiers 581, 582, 583, respectively, and these amplified signals are transmitted to the mobile station from antennas 591, 592, and 593, respectively.

In other words, original transmission data and two delayed transmission data, which are obtained by delaying original transmission data by the different amount of delay, are transmitted to the mobile station by the same radio carrier frequency fc.

In the base station, as one of control functions of a controller 60, there is provided RAKE data notifying control means 60a. RAKE data notifying control means 60a generates RAKE data including data, which shows the amount of delay set to the first and second delay circuits 531 and 532, and data, which shows a number of schemes of delayed transmission data. Then, RAKE data is transferred to a transmission data generating section 50 to be notified to the mobile station. The transmission data generating section 50 generates transmission data corresponding to one slot length in which RAKE data is added to speech data. Then, transmission data is transmitted to the mobile station by use of a forward speech channel.

FIG. 14 shows one example of a transmission format of transmission data including RAKE data. This example shows a case in which data, which shows that the number of the schemes of delayed transmission data is "2" and that the amounts of delay provided to these delayed transmission data are "12 times" and "20 times", is inserted to RAKE data.

Figure 9:
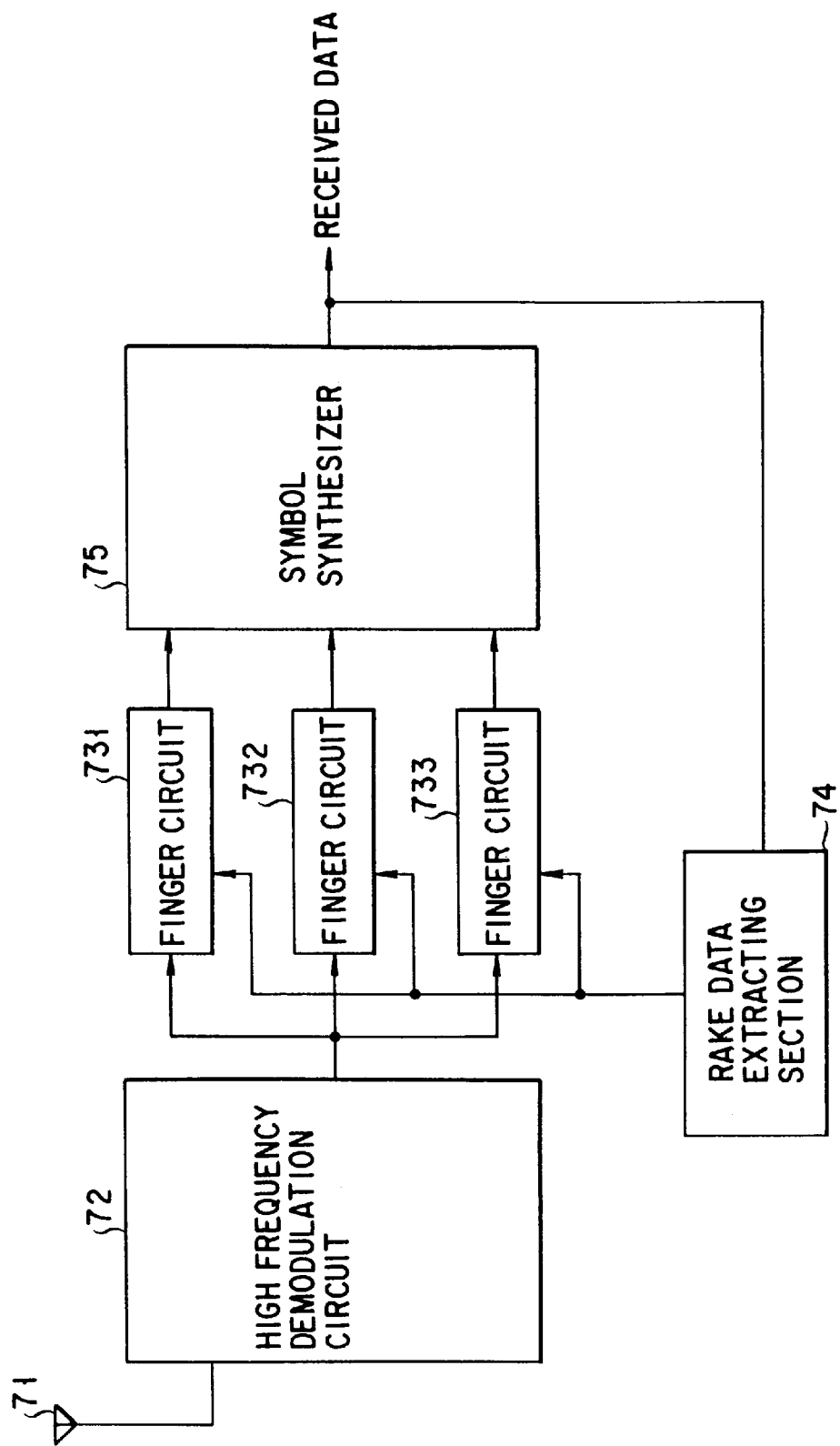
FIG. 9 is a circuit block diagram representing a main structure of a receiving section of a mobile station of the system of the second embodiment of the present invention.

On the other hand, the receiving system of the mobile station is formed as follows. FIG. 9 shows a circuit block diagram representing the main structure.

In this figure, a radio frequency signal received by an antenna 71 is mixed with a local oscillation signal by a high frequency demodulation circuit 72, down-converted to an intermediate frequency signal or a base band signal, and inputted to each of finger circuits 731, 732, and 733. These finger circuits, each which comprises a timing/tracking loop and a data demodulating section, operate independently.

Figure 10:
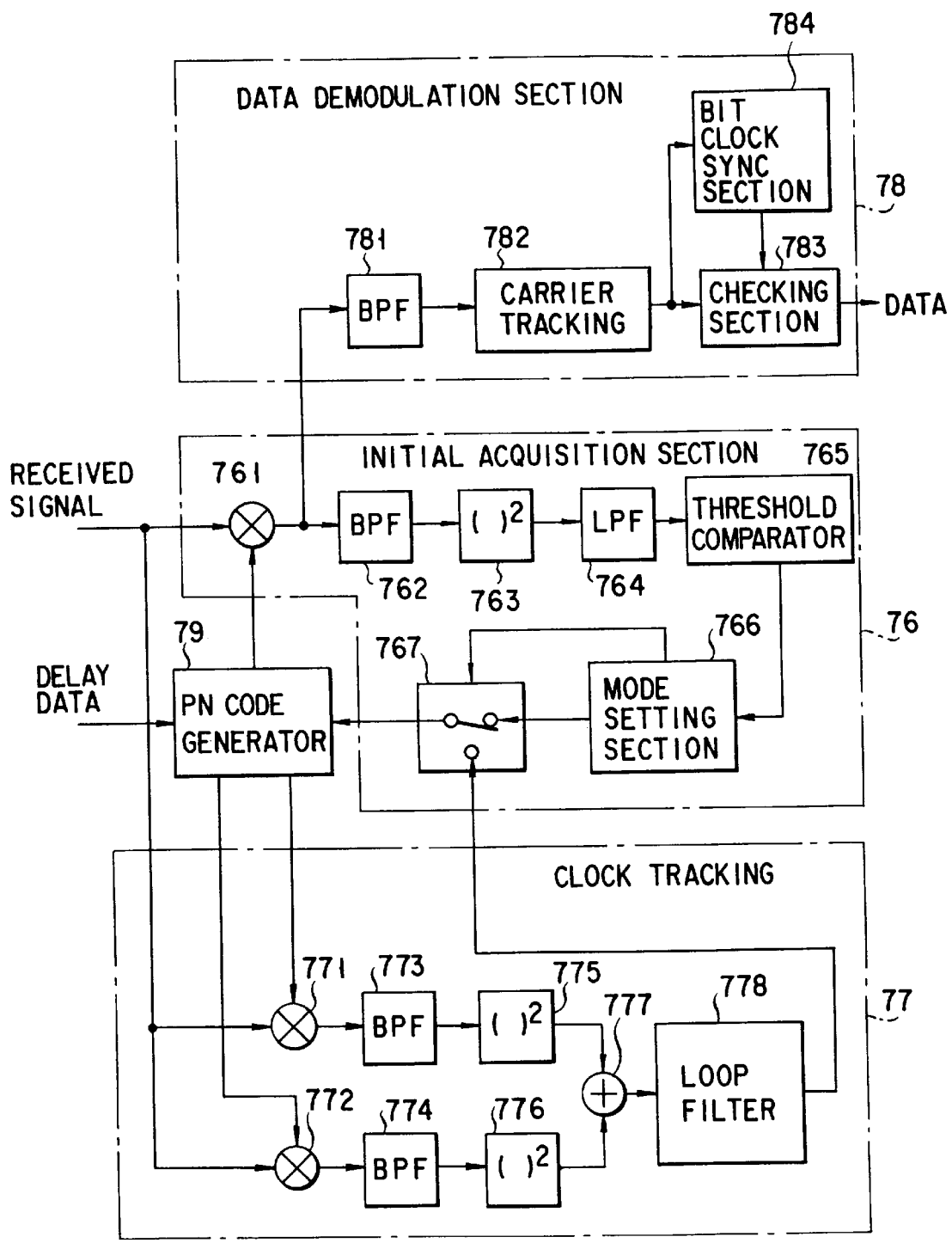
FIG. 10 is a circuit block diagram representing an example of a structure of a finger circuit of the mobile station of FIG. 9.

FIG. 10 is a circuit block diagram representing one example of the structure of the finger circuits 731, 732, and 733. As shown in the figure, each of the finger circuits comprises an initial acquisition section 76 constituting the timing/tracking loop, a clock tracking section 77, and a a data demodulating section 78.

The initial acquisition section 76 performs a synchronous acquisition of the received signal by use of a sliding correlation method.

The sliding correlation method is a method for demodulating a modulation wave by the reverse spread before the spread spectrum only when both code phases are consistent with each other at the time of gradually shifting the PN code of the transmission side and that of the receiving by the shift of the clock phase between receiving and transmitting.

In FIG. 10, the received signal outputted from the high frequency demodulation circuit 72 is synthesized with a PN code generated from a PN code generator 79 by a mixer 761, and reversely spread. Thereafter, the received signal is inputted to a square circuit 763 through a band pass filter (BPF) 762 to be squared. The squared received signal is inputted to a threshold comparator 765 through a low pass filter (LPF) 764 to be compared with a threshold value. At this time, if a code synchronization is obtained, the level of the received signal exceeds the threshold value instantaneously. Then, the instant that the level of the received signal exceeds the threshold value, the threshold comparator 765 notifies a synchronous establishing signal to a mode setting section 766. When the mode setting section 766 receives the synchronous establishing signal, the mode setting section 766 changes a switch 767 from the PN code generating section 79 to the clock tracking section 77.

The clock tracking section 77 uses a delay lock tracking loop. The received signal is reversely spread by each of mixers 771 and 772 based on the PN code. Thereafter, the received signal is inputted to each of square circuits 775 and 776 through each of band pass filters (BPF) 773 and 774 to be squared. Outputs of the square circuit 775 and 776 are added to each other by an adder 777, and inputted to a loop filter 778. In the loop filter 778, an addition output signal of the adder 777 is converted to a d.c. signal, and the d.c. signal, serving as a phase control signal, is inputted to a PN code generator 79 through a switch 767 of the initial acquisition section 76. The details of the lock tracking technique using the delay lock tracking loop are explained in D. C. DIXON, Spread Spectrum Systems, "CHAPTER 6 SYNCHRONIZATION", A Wiley-Interscience Publication, 1976.

The data demodulating section 78 demodulates data from the modulation signal having a narrow band to which reverse spread processing is provided. More specifically, the reversely spread modulation signal outputted from the mixer 761 of the initial acquisition section 76 is guided to a carrier tracking section 782 after being passed through a band pass filter (BPF) 781. Then, the tracking against the carrier is performed. The tracked modulation signal is inputted to a checking section 783 and a bit clock synchronizing section 784. The bit clock synchronizing section 784 obtains a synchronous signal to be synchronized with the modulation signal outputted from the carrier tracking section 782, and the obtained synchronous signal is inputted to the checking section 783. The checking section 783 is synchronized with the synchronous signal, checks the code of the modulation signal, and outputs the checked output as modulated data.

Data of three schemes outputted from each of the finger circuits 731, 732, and 733 is inputted to a symbol synthesizer. The symbol synthesizer 75 synthesizes data of the three schemes, thereby reproducing received data. Received data is outputted to the CODEC (not shown) to process the data decoding, and inputted to a RAKE data extracting section 74. The RAKE data extracting section 74 extracts RAKE data from received data, and provides delay data included in RAKE data to a PN code generator 79. The PN code generator 79 decides a generation phase of the PN code in accordance with delay data.

The following will explain PN codes B (Base), L (Late), and E (Early), which are generated from the PN code generator 79.

FIG. 11 shows an example of the structure of the PN code generator for generating a PN code.

In the figure, reference numeral 791 shows a shift register of a five-stage structure. Parallel shift outputs of the shift register 791 are inputted to an adder group 793 through a tap group 792. Then, the outputs are added by the adder group 793, and inputted to the shift register 791 in series. According to this structure, suitable tap coefficients (h1, h2, h3, h4, h5) are provided to the tap group 792, so that the PN code of M scheme can be outputted from the shift register 791.

For example, as shown in FIG. 12, the following tap coefficients are provided to the tap group 792.

(h1, h2, h3, h4, h5)=(1, 1, 0, 1, 1)

Then, the following initial values are registers R1, R2, R3, R4, R5 of the shift register 791, respectively.

(s1, s2, s3, s4, s5)=(1, 1, 0, 0, 1)

Whereby, the necessary PN codes E, L, B can be generated.

As mentioned above, marks E and L of the PN codes are abbreviations of "Early" and "Late", respectively, and the early PN code and the late PN code are shown. Normally, the time width of each of the PN codes E and L is set to be one chip length. The PN code B, which is used to decode data, is set be delayed by a half clock of the chip clock of the PN code E. FIG. 13 shows a circuit for generating a generation timing of each of PN codes E, L, and B.

The following will explain an operation of the above-structured system.

If the speech channel is set between between the base station and the mobile station, in the base station, RAKE data, which includes a number of schemes of delay transmit data and an amount of delay set to the delay circuits 531 and 532, is generated by the controller 60, and RAKE data is added to speech data to be transmitted to the mobile station through the speech channel. In this example, as shown in FIG. 14, there is transmitted RAKE data, which shows that the number of the schemes of delayed transmission data is "2" and that the amounts of delay provided to these delayed transmission data are "12 times" and "20 times."

Figure 15:
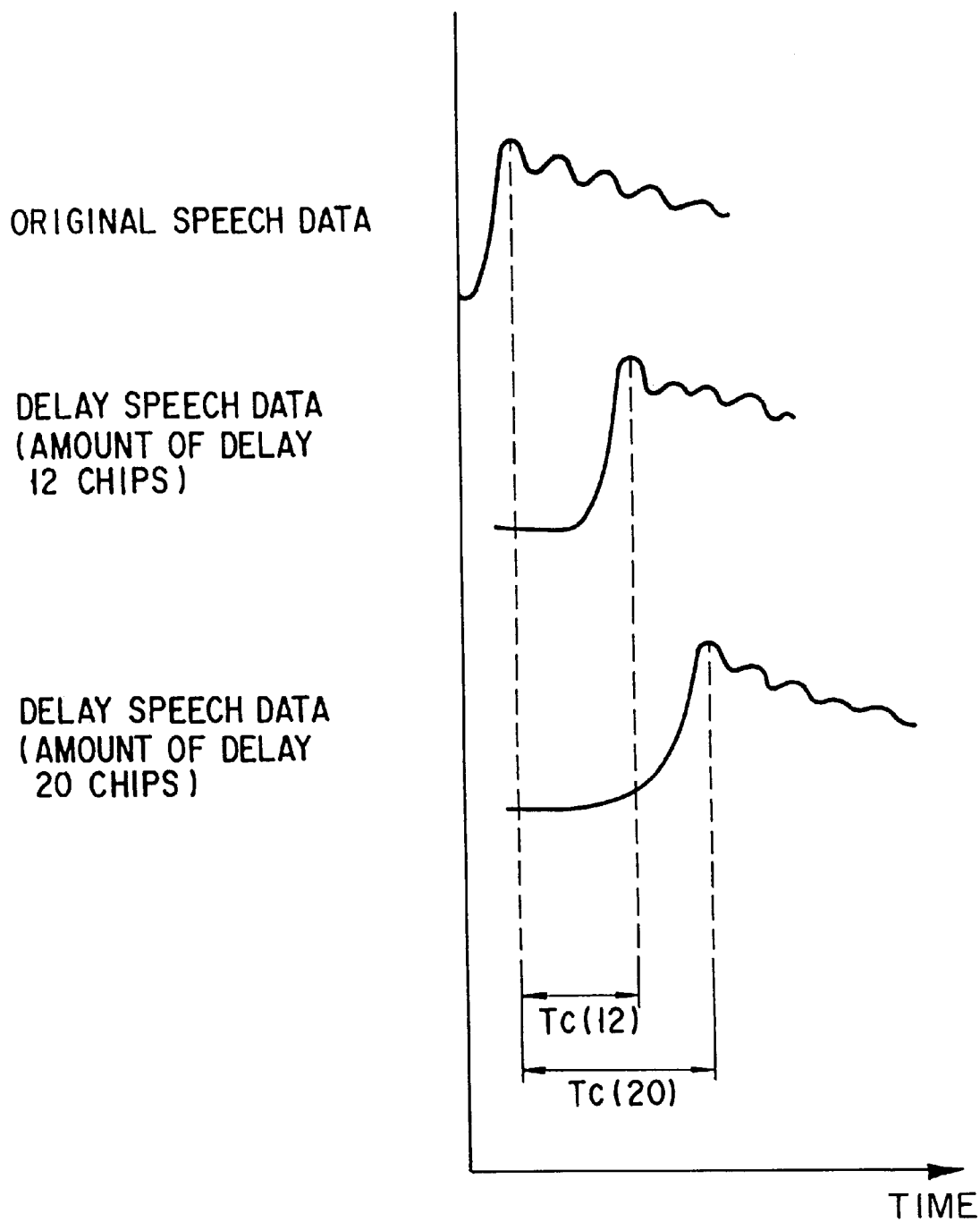
FIG. 15 is a view representing the relationship between original speech data and delay speech data of two schemes, which are generated to be artificially delayed, in the amount of delay.

When the transmission of RAKE data is ended and the transmission of speech data is started, original speech data having no delay and speech data of two schemes are transmitted to the mobile station from the base station by the same radio carrier frequency, respectively. In this case, speech data of two schemes are delayed from original data by time corresponding to 12 chips of the PN code, and time corresponding to 20 chips of the PN code, respectively. In other words, for example, as shown in FIG. 15, original speech data and delay speech data of two schemes, which are generated to be artificially delayed, are synthesized on the radio transmission path and transmitted from the base station.

On the other hand, in the mobile station, when the speech channel is set between the base station and the is mobile station, the RAKE data extracting section 74 monitors the arrival of RAKE data. Then, when RAKE data is received, the generation phase of the delay code is set to the PN code generator 79 of each of the finger circuits 731, 732, and 733 in accordance with the contents of RAKE data, "2, 12, 20." For example, the amount of delay, "0", is set to the PN code generator of the finger circuit 733, the amount of delay, "12", is set to the PN code generator of the finger circuit 732, and the amount of delay, "20", is set to the PN code generator of the finger circuit 731.

Due to this, in receiving the following speech data, the generation of the PN code is started without delaying from the PN code generator of the finger circuit 733. The PN code generator of the finger circuit 732 is started to generate a PN code by 12 chips later than timing when the PN code generator of the finger circuit 733 is started to generate the PN code. Similarly, the PN code generator of the finger circuit 731 is started to generate a PN code by 20 chips later than timing when the PN code generator of the finger circuit 733 is started to generate the PN code.

Therefore, when original speech data and delay speech data of two schemes, which are generated to be artificially delayed, are arrived from the base station under this state, original speech data is reversely spread and demodulated by the PN code having no delay in the finger circuit 733. Also, delay speech data, which is delayed by 12 chips, is reversely spread and demodulated by the PN code, which is delayed by 12 chips, in the finger circuit 732. Similarly, delay speech data, which is delayed by 20 chips, is reversely spread and demodulated by the PN code, which is delayed by 20 chips, in the finger circuit 731. Then, speech data, which is demodulated by these finger circuits 731, 732, and 733, is synthesized by the symbol synthesizer, thereby reproducing received speech data.

According to this embodiment, in the base station, there is artificially generated delayed speech data of two schemes in which original speech data is delayed by 12 chips and 20 chips of the PN code, respectively. Then, these delayed speech data are synthesized on the same radio transmission line together with speech data, and synthesized data is transmitted to the mobile station. Prior to the transmission of speech data, the number of schemes of each delayed data and the amount of delay are notified to the mobile station as RAKE data. On the other hand, in accordance with RAKE data notified from the base station, timing of starting the generation of the PN code is set to the PN code generator 79 of each of the finger circuits 731, 732, and 733 of the RAKE receiver. Then, original speech data, which is arrived from the base station, and delayed speech data are demodulated under this state, and synthesized by the symbol synthesizer, thereby reproducing received speech data.

Therefore, according to this embodiment, in the RAKE receiver of the mobile station, it is not needed that the phase of the PN code be varied to search delay speech data. Due to this, original speech data and each delayed speech data are efficiently synthesized, so that received data having a high S/N can be reproduced.

The above-mentioned second embodiment can be variously modified as follows.

More specifically, the above embodiment explained the case in which the plurality of delay circuits 531, and 532, mixers 561, 562, and 563 for a conversion of frequency, band pass filters 571, 572, and 573, transmission amplifiers 581, 582, and 583, and the antennas 591, 592, and 593 are arranged in parallel. However, the plurality of the delay circuits and the antennas can be arranged in series.

Figure 16:
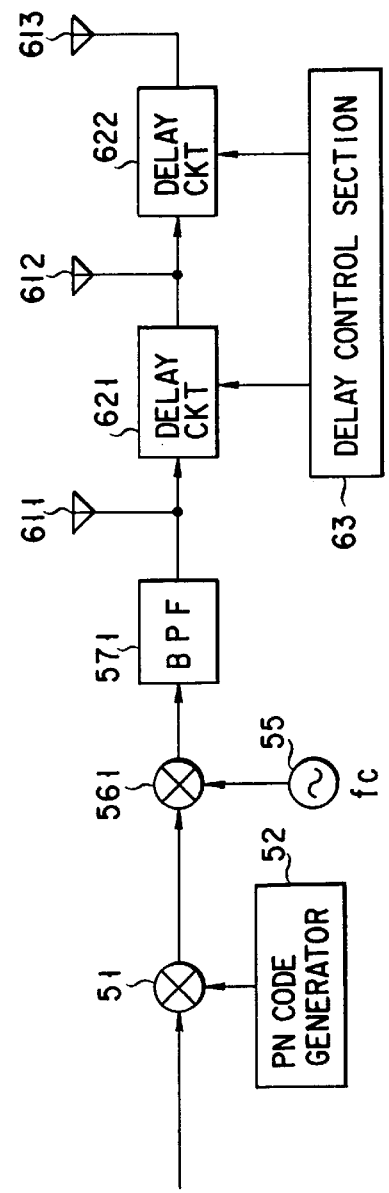
FIG. 16 is a circuit block diagram representing a main structure of a base station of a modification of a second embodiment of the present invention.

More specifically, FIG. 16 is a circuit block diagram representing one example the structure, and the same reference numerals common to FIG. 8 are added to FIG. 16. In the figure, the modulating carrier signal outputted from the mixer 561 is subjected to a predetermined frequency band limitation by the band pass filter (BPF) 571. Thereafter, the modulating carrier signal is transmitted to the radio channel from a first antenna 611. Also, the modulating carrier signal outputted from the BPF 571 is inputted to a first delay circuit 621 to be delayed by a first corresponding amount of the delay. Thereafter, the delayed signal is transmitted to the radio channel from a second antenna 612. Moreover, the modulating carrier signal outputted from the first delay circuit 621 is sequentially inputted to the second delay circuit 622 to be delayed by a second corresponding amount of the delay. Thereafter, the delayed signal is transmitted to the radio channel from a third antenna 613. The first and second amounts of delay are set by a controller 63 for an amount of delay.

For example, similar to the second embodiment, it is assumed that delayed speech data to which delay corresponding to the chip multiples of the PN code, "12" and "20" is provided is transmitted to the mobile station. The amount of delay "12 times" is set to the first delay circuit 621, and the amount of delay "20−12=8" is set to the second delay circuit 622.

According to the above-mentioned structure, the number of the mixers for a conversion of frequency, that of the band pass filters, and that of the transmission amplifiers can be reduced to $\frac{1}{3}$, respectively, as compared with the structure of FIG. 8. Thereby, the circuit structure can be simplified.

The above second embodiment explained the case in which the RAKE receiver of the finger circuit type is used. However, the present invention can be applied to the RAKE receiver of the transversal filter type in which the transversal filter is connected to the output of the matched filter. FIG. 17 is a circuit block diagram representing the structure.

In the figure, the modulating carrier signal arrived from the base station is received by an antenna 91, mixed with a local oscillation signal generated from a local generator 93, and down-converted to an intermediate frequency or a base-band received signal. Then, the down-converted received signal is inputted to a matched filter 95 through a low pass filter (LPF). If the received signal is inputted to the matched filter 95, a pulse string having a plurality of peak strings is outputted in accordance with arrival time and the density of the signal as shown in FIG. 6. The pulse string is inputted to a RAKE receiving section 96.

The RAKE receiving section 96 comprises a transversal filter with taps, which are arranged at a time interval of an inverse number of a PN code rate (chip rate). FIG. 18 shows one example of the structure. The pulse string outputted from the matched filter 95 is delayed so as to obtain the time interval of the inverse number of the chip rate by a delay line 961. Thereafter, the pulse string is inputted to corresponding taps 962. Then, tap coefficients aO to an are weighted onto these taps 962 to be added to each other by an adder 963, and outputted as demodulation data.

In this type of the RAKE receiving section, tap coefficients a0 to an may be set to the taps 962 in accordance with RAKE data notified from the base station, in order to synthesize the plurality of peaks outputted from the matched filter 95.

By setting the tap coefficients as mentioned above, original transmission data transmitted from the base station and delay transmission data of two schemes, which are respectively delayed by 12 chips of the PN code and 20 chips of PN code from original transmission data, are efficiently synthesized, so that demodulation data having a high S/N can be reproduced.

The above second embodiment explained that the notification of RAKE data and the phase setting of the PN code based on RAKE data were performed prior to the start of the receiving and transmitting of speech data. However, in a case where RAKE data is changed after the receiving and transmitting of speech data is started, the notification of RAKE data and the phase setting of the PN code based on RAKE data may be performed at this time.

Furthermore, the above embodiments explained the case in which delayed transmission data of two schemes are generated to be transmitted. However, delayed transmission data of three or more schemes may be generated to be transmitted. Moreover, the second embodiment explained the case that delayed transmission data of two schemes and original transmission data of one scheme are transmitted. However, there may be formed the structure in which no original transmission data is transmitted and delayed transmission data of two or more schemes.

In addition, regarding the amount of delay to be provided each delay transmission data, other specific structure of the base station, and that of the RAKE receiver, various modifications can be worked within the range without deviating from the features of the present invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A spread spectrum radio communication system including a function of transmitting an original transmission signal between a base station and a mobile station, and a function of synthesizing a plurality of the same transmission signals received to have a time difference by a signal receiving/reproducing circuit including delay means and synthesizing means so as to reproduce said original transmission signal to said mobile station, said base station comprising:
weighting data generating means for generating weighting data to be provided to said synthesizing means of said signal receiving/reproducing circuit in accordance with a characteristic of a radio transmission path between said base station and said mobile station; and
weighting data transmitting means for transmitting weighting data obtained by said weighting data generating means, and said mobile station comprising:
weighting data receiving means for receiving weighting data notified from said base station; and
weighting data setting means for setting weighting data received by said weighting data receiving means in said synthesizing means, whereby said synthesizing means synthesizes the received same transmission signals in accordance with said weighting data.

2. The system according to claim 1, wherein said weighting data generating means estimates the transmission characteristic of the radio transmission path directing from said base station to said mobile station based on a receiving state of a radio signal transmitted to said base station from said mobile station.

3. The system according to claim 2, wherein when a common radio frequency is allocated to a forward link directing to said mobile station from said base station and a reverse link directing to said base station from said mobile station, and a transmission format of a radio communication signal transmitted by the common radio frequency is formed to time-divisionally duplex a plurality of slots for the forward link and a plurality of slots for the reverse link, said weighting data generating means detects a receiving state of the radio signal transmitted through said reverse link, and calculates weighting data based on the result of the detection.

4. The system according to claim 2, wherein when a different radio frequency is allocated to a forward link directing to said mobile station from said base station and a reverse link directing to said base station from said mobile station, said weighting data generating means detects a receiving state of the radio signal transmitted through said reverse link, estimates a transmission quality of the radio transmission path of said forward link based on the result of the detection, and calculates weighting data based on the result of the estimation.

5. In a radio communication system for executing a radio communication between a first radio station and a second radio station having a RAKE receiver for synthesizing a plurality of the same transmission signals received to have a time difference, through a radio transmission path, said first radio station comprising:
weighting data generating means for generating weighting data to be provided to said RAKE receiver in accordance with a characteristic of the radio transmission path; and
weighting data notifying means for notifying the weighting data obtained by said weighting data generating means to said second radio station to be set in said RAKE receiver.

6. In a radio communication system for executing a radio communication between a first radio station and a second radio station having means for generating weighting data in accordance with a characteristic of a radio transmission path and means for notifying said generated weighting data to said first radio station, through said radio transmission path, said first radio station comprising:
signal reproducing means for synthesizing a plurality of the same transmission signals received to have a time difference after being delayed by delaying means so as to reproduce an original transmission signal;
weighting data receiving means for receiving weighting data notified from said second radio station; and
weighting data setting means for setting said weighting data received by said weighting data receiving means in said signal reproducing means, whereby said signal reproducing means provides processing of the received same transmission signals in accordance with said weighting data.

7. A spread spectrum radio communication system for transmitting a transmission signal between a base station and a mobile station by use of a spread spectrum communication system, said base station comprising:

spread processing means for spread spectrum processing a modulated transmission signal, using a spread code to output a first transmission signal;

delay processing means for delaying the first transmission signal outputted from said spread processing means by time corresponding to a multiple of an integer of a chip rate of said spread code so as to generate second transmission signals of a plurality of schemes having an arbitrary relative time difference;

transmitting means for transmitting the second transmission signals of the plurality of schemes generated by said delay processing means to said mobile station by a same radio frequency; and control data notifying means for notifying data representing an amount of delay used to generate said second transmission signals in said delay processing means and data representing a number of schemes of the second transmission signals transmitted by said transmitting means to said mobile station, said mobile station comprising:

receiving means for receiving the second transmission signals of the plurality of schemes having a time difference transmitted from said base station by the same radio frequency; and signal reproducing means for synthesizing the second transmission signals of the plurality of schemes received by said receiving means after adjusting the time positions of the second transmission signals based on data representing the amount of delay notified from said base station and data representing the number of schemes of the second transmission signals so as to reproduce said first transmission signal.

8. The system according to claim 7, wherein said delay processing means generates a delay transmission signal of at least one scheme having an arbitrary time difference to the first transmission signal, and outputs said delay transmission signal and said first transmission signal as the second transmission signals.

9. The system according to claim 7, wherein said delay processing means delays the first transmission signal by a plurality of amounts of delay corresponding to the multiple of the integer of the chip rate of the spread code to generate delay transmission signals of the plurality of schemes having an arbitrary relative time difference, and outputs these delay transmission signals as the second transmission signals.

10. The system according to claim 7, wherein said delay processing means provides a plurality of delay circuits in parallel to said first transmission signal of one scheme outputted from said spread processing means, and said first transmission signal is branched and inputted to these delay circuits to be delayed, thereby the second transmission signals of the plurality of schemes are generated.

11. The system according to claim 7, wherein said delay processing means provides a plurality of delay circuits in series to said first transmission signal of one scheme outputted from said spread processing means, and said first transmission signal is sequentially inputted to these delay circuit to be delayed, thereby the second transmission signals of the plurality of schemes are generated.

12. The system according to claim 7, wherein said signal reproducing means comprises a plurality of finger circuits, each having a timing tracking loop and a data demodulation section, to variably set the spread code phase of said plurality of finger circuits based on data representing a time difference notified from said base station and data representing the number of the second transmission signals.

13. The system according to claim 7, wherein signal reproducing means comprises a matched filter and a transversal filter with taps for multi-path synthesizing a pulse string outputted from said matched filter by changing weighting of tap coefficients to be added, and the tap coefficient of said transversal filter with taps is variably set based on data representing the amount of delay notified from said base station and data representing the number of the second transmission signals.

14. In a radio communication system for executing a radio communication between a first radio station and a second radio station having signal reproducing means for synthesizing a plurality of the same second transmission signals received to have a time difference to reproduce a first transmission signal, through a radio transmission path, said first radio station comprising:

generating means for generating the same second transmission signals of a plurality of schemes each having a predetermined time difference based on a first transmission signal;

transmitting means for transmitting said second transmission signals of the plurality of schemes generated by said generating means to said second radio station by the same radio frequency; and data notifying means for notifying time difference data representing a time difference of said second transmission signals based on said first transmission signal and scheme data representing a number of schemes of said second transmission signals, so as to be used to synthesize the second transmission signals of said signal reproducing means.

15. In a radio communication system for executing a radio communication between a first radio station and a second radio station having means for generating second transmission signals of a plurality of schemes each having a predetermined time difference based on first transmission signal, means for transmitting said second transmission signals of the plurality of schemes by the same radio frequency, and means for transmitting time difference data representing a time difference of said second transmission signals based on said first transmission signal and scheme data representing a number of schemes of said second transmission signals, through a radio transmission path, said first radio station comprising:

transmission signal receiving means for receiving said second transmission signals of the plurality of schemes transmitted from said second radio station;

notified data receiving means for receiving said time difference data notified from said second radio station and said scheme data; and signal reproducing means for synthesizing said second transmission signals received from said transmission signal receiving means after adjusting the time positions based on said time difference data received from said notified data receiving means and said scheme data so as to reproduce said first transmission signal.

16. A spread spectrum communication system comprising a first station and a second station, wherein said first station comprises:
- a RAKE receiver section for receiving transmissions from said second station;
- a parameter estimating section for estimating characteristics of transmissions to be transmitted to said second station on the basis of characteristics of at least one of the transmissions received from said second station and calculating RAKE control data in accordance with the estimated characteristics; and
- a transmitter for transmitting the transmissions to said second station, at least one of the transmissions including the calculated RAKE control data, and wherein said second station comprises:
- a RAKE receiver for receiving the transmissions from said first station; and
- a RAKE control data extracting section for extracting the RAKE control data from the at least one transmission received from said first station and supplying the extracted RAKE control data to said RAKE receiver.

17. The spread spectrum communication system according to claim 16, wherein said RAKE receiver of said second station comprises a filter including taps, the extracted RAKE control data comprising tap coefficients for said taps.

18. The spread spectrum communication system according to claim 17, wherein said tap coefficients switch said taps ON and OFF.

19. The spread s communication system according to claim 16, wherein said RAKE receiver of said second station comprises finger circuits, the extracted RAKE control data comprising data for controlling symbol synthesis by said finger circuits.

20. The spread spectrum communication system according to claim 16, wherein the transmissions from said first station and the transmissions from said second station are at the same frequency.

21. The spread spectrum communication system according to claim 16, wherein the transmissions from said first station and the transmissions from said second station are at different frequencies.

22. The spread spectrum communication system according to claim 16, wherein the RAKE control data is transmitted to said second station prior to communication of speech data between said first and second stations.

23. The spread spectrum communication system according to claim 16, wherein the RAKE control data is transmitted to said second station subsequent to communication of speech data between said first and second stations.

24. The spread spectrum communication system according to claim 16, wherein updated RAKE control data is calculated and transmitted to said second station when the characteristics of the received transmissions from said second station change by more than a predetermined amount.

25. The spread spectrum communication system according to claim 16, wherein said first station is a base station and said second station is a mobile station.

26. A spread spectrum communication system comprising first and second stations, wherein said first station comprises:
- a signal generating circuit for generating a signal for transmission to said second station;
- a parameter generating circuit for generating RAKE control data which is included in the signal;
- delay circuits for delaying the signal to generate delayed signals;
- a transmitter for transmitting the signal and the delayed signals to said second station, and wherein said second station comprises:
- a RAKE receiver for receiving the signal and the delayed signals from said first station; and
- a RAKE control data extracting section for extracting the RAKE control data from the transmission from said first station and supplying the extracted RAKE control data to said RAKE receiver.

27. The spread spectrum communication system according to claim 26, wherein said RAKE receiver of said second station comprises a filter including taps.

28. The spread spectrum communication system according to claim 26, wherein said RAKE receiver of said second station comprises finger circuits.

29. The spread spectrum communication system according to claim 26, wherein the RAKE control data supplied to said RAKE receiver includes data regarding the number of delayed signals and data regarding the delay associated with each of the delayed signals.

* * * * *

UNITED STATES PATENT AND TRADEMARK OFFICE
CERTIFICATE OF CORRECTION

PATENT NO. : 5,943,362
DATED : August 24, 1999
INVENTOR(S) : Naritoshi Saito

Page 1 of 1

It is certified that error appears in the above-identified patent and that said Letters Patent is hereby corrected as shown below:

Title page,
Item [73] Assignee, "Kawasaki" has been replaced with -- Kawasaki-shi --.

Column 18, claim 11,
Line 2, "circuit" has been replaced with -- circuits --.

Column 19, claim 19,
Line 31, "s" has been replaced with -- spectrum --.

Signed and Sealed this

Eighteenth Day of December, 2001

Attest:

Attesting Officer

JAMES E. ROGAN
Director of the United States Patent and Trademark Office